US012759356B2

(12) United States Patent
Weems

(10) Patent No.: US 12,759,356 B2
(45) Date of Patent: Oct. 13, 2026

(54) TRAILER HITCH JACK COVER AND SECURING DEVICE

(71) Applicant: Anthony Weems, Howell, MI (US)

(72) Inventor: Anthony Weems, Howell, MI (US)

( * ) Notice: Subject to any disclaimer, the term of this patent is extended or adjusted under 35 U.S.C. 154(b) by 782 days.

(21) Appl. No.: 17/698,502

(22) Filed: Mar. 18, 2022

(65) Prior Publication Data

US 2022/0297486 A1 Sep. 22, 2022

Related U.S. Application Data

(60) Provisional application No. 63/163,332, filed on Mar. 19, 2021.

(51) Int. Cl.
*B60D 1/60* (2006.01)
*B60D 1/66* (2006.01)

(52) U.S. Cl.
CPC ................ *B60D 1/60* (2013.01); *B60D 1/66* (2013.01)

(58) Field of Classification Search
CPC . B60D 1/60; B60D 1/605; B60D 1/66; B60D 1/665; B60D 1/00; B60D 1/58; B60S 9/18
USPC .......................................... 280/507; 150/166
See application file for complete search history.

(56) References Cited

U.S. PATENT DOCUMENTS

| | | | | |
|---|---|---|---|---|
| D349,800 | S | 8/1994 | Chambers | |
| 5,527,056 | A * | 6/1996 | Hoagland | B60D 1/60 280/507 |
| 5,806,873 | A * | 9/1998 | Glassman | B60D 1/60 280/507 |
| 6,832,775 | B1 | 12/2004 | Muller | |
| D862,029 | S | 10/2019 | Blakely | |
| 10,518,746 | B1 * | 12/2019 | Grimmett | B60D 1/605 |
| 10,569,607 | B1 | 2/2020 | Alalouf | |
| 10,821,792 | B1 | 11/2020 | Alalouf | |
| 2006/0061064 | A1 | 3/2006 | Johnson | |
| 2008/0146397 | A1 * | 6/2008 | Drake | B60S 9/08 475/206 |
| 2018/0029430 | A1 * | 2/2018 | Abernethy, Jr. | B60D 1/60 |

* cited by examiner

*Primary Examiner* — Monica S Carter
*Assistant Examiner* — Kent N Shum
(74) *Attorney, Agent, or Firm* — Carrier, Shende & Associates P.C.; Joseph P. Carrier; Fulchand P. Shende

(57) ABSTRACT

A trailer hitch jack cover includes a housing with a lower open end and configured to be securely disposed over a trailer hitch jack to enclose an operative upper portion of a hitch jack including an adjustment mechanism, a cushion member secured to the housing and covering to an upper surface of the housing, and a fastening mechanism which secures the housing to the hitch jack. The housing is formed of rigid material and includes a side wall which defines an open space therein and an upper member which is fixed to and closes an upper end of the side wall. The cushion member covers an upper surface of the housing upper member.

7 Claims, 9 Drawing Sheets

TRAILER HITCH JACK COVER AND SECURING DEVICE

CROSS-REFERENCE TO RELATED APPLICATIONS

This non-provisional application claims priority to U.S. Provisional Application Ser. No. 63/163,332, filed Mar. 19, 2021.

BACKGROUND OF THE INVENTION

Field of the Invention

The present invention pertains to a trailer hitch jack cover which provides several functions, e.g., it is a covering device which may remain secured over a hitch jack other than when the hitch jack is being operated or adjusted, it provides a cushioned upper surface that may be engaged by the tail gate of a pickup truck or other objects to prevent damage to the tailgate or other objects, it provides a lockable security device which may be secured over a hitch jack to prevent unauthorized use of or damage to the hitch jack, it has a favorable ornamental appearance, and may be manufactured at relatively low cost.

Description of the Background Art

Trailer hitch jacks are typically secured at the front end of trailers near the trailers' hitches which connect to securing balls or other mechanisms on vehicles which tow the trailers. Hitch jacks typically include adjustable mechanisms such as telescopic legs which can be extended and retracted between operational and non-operational positions as desired using screw mechanisms in the telescopic legs movable by rotatable handles or other adjustment mechanisms included with the hitch jacks. When extended to an operational position, a lower end of the telescopic leg of a hitch jack will engage the ground or other support surface so that the trailer itself will remain in a stand-alone, substantially horizontal orientation as supported by the trailer's wheels disposed at an intermediate or rear portion of the trailer and the hitch jack telescopic leg disposed at the front of the trailer. When thus supported by the trailer hitch jack, the trailer need not be connected to a vehicle. When the trailer is connected to a vehicle the telescopic leg of the hitch jack will typically be retracted so that it will not engage the ground as the trailer is traveling.

A common problem associated with hitch jacks is that they extend upward from the front portion of the trailer on which they are disposed, e.g., by about one foot or more, due to the telescopic nature of the hitch jack, and people often may forget about the hitch jack when the trailer is connected to a vehicle such as a pickup truck and inadvertently open a pickup truck's tailgate by rotating it downward such that the tailgate impacts against the top of the hitch jack, thereby inadvertently damaging the tailgate and/or the hitch jack.

To overcome this common problem, many known hitch jack covers have been proposed and are available for purchase. Typically, the known hitch jack covers may be disposed over at least an upper portion of a hitch jack and include a cushion or cushioning material which would be disposed over the upper surface of the hitch jack so that pickup truck tailgates or other objects which may be inadvertently contacted or impacted against the hitch jack will instead engage the cushion or cushioning material and not be damaged. Some known hitch jack covers are formed as a single piece of rubber, elastomer or elastomeric foam which may be secured snugly over an upper portion of the hitch jack or over a front portion of the trailer including the hitch jack. Some other known hitch jack covers include an outer shell or housing that may be formed of fabric, plastic, leather, etc., cushioning material provided within an upper portion of the shell, and fastening means such as VELCRO® straps, zippers, snaps, etc. for securing the shell onto the upper portion of the hitch jack. Some of the known covers also permit access to switches and other electronic controls provided with the hitch jacks so that the switches and other electronics may be utilized with the cover secured onto the hitch jack. A few known hitch jack covers are disclosed in U.S. Pat. No. 10,569,607, D349,800, D862,069 and US Pub. 2006/0061064 and commercial versions of these are available for purchase.

While the known hitch jack covers are generally effective for their intended purposes, they remain to be improved on in several respects. For example, because the covers are generally intended to remain secured to the hitch jacks at all times other than when the hitch jacks are being adjusted, they may be damaged from prolonged exposure to the environment, noting that many of the known covers are formed of relative soft materials that can be easily cut, ripped or otherwise damaged. As another example, many of the known covers are not securely locked onto the hitch jacks and may be removed by unauthorized persons, and otherwise do not provide any extra security against unauthorized use of the hitch jacks. Still further, the known covers provide little, if any, particularly aesthetic characteristics to the hitch jacks.

Thus, there remains a need in the art for an improved hitch jack cover which overcomes the disadvantages of the known hitch jack covers, is not complex, and may be manufactured at relatively low cost.

SUMMARY OF THE INVENTION

An object of the present invention is to satisfy the discussed need in the art.

According to a first aspect of the present invention there is provided a trailer hitch jack cover comprising: a housing with a lower open end and configured such that it may be securely disposed over a hitch jack to enclose an operative upper portion of a hitch jack including an adjustment mechanism such as a crank handle; a cushion member secured to the housing and covering to an upper surface of the housing; and a fastening mechanism which secures the housing to the hitch jack. The housing includes a side wall which defines an open space therein and is formed of metal and/or other rigid material and an upper member also formed of metal and/or other rigid material, which is fixed to and closes an upper end of the side wall. The cushion member covers the upper surface of the housing upper member. The fastening mechanism includes a pin which extends through opposed openings defined in the housing side wall such that at least one end of the pin extends outward of the side wall, and a securing device which operatively engages said at least one end of the pin which extends outward of the side wall to secure the pin to the side wall.

The opposed openings defined in the housing side wall may be configured such that when the pin is extended through the openings the pin will extend beneath and adjacent to the adjustment mechanism of the hitch jack when the housing is disposed over the hitch jack including the adjustment mechanism, such that the pin, the side wall and the adjustment mechanism jointly secure the housing onto the hitch jack. Preferably, location of the openings will be such that when the pin is extended through the openings the pin engages the adjustment mechanism or another part of the hitch jack to restrict or prevent hitch jack cover from moving relative to the hitch jack. Any such movements would be undesirable as they would likely result in unwanted rattling and vibrations of the hitch jack cover whenever the trailer on which hitch jack and cover are mounted is travelling, and may also cause damage to the hitch jack over time.

The hitch jack cover according to the first aspect of the invention is very advantageous over conventional hitch jack covers for several reasons. For example, hitch jack cover according to the first aspect of the invention encloses an operative portion of the hitch jack including the adjustment mechanism so that it prevents these parts of the hitch jack from being exposed to the environment, it is not easily damaged or compromised because side wall and upper member are formed of metal and/or other rigid materials, and it provides an much more aesthetic appearance than the hitch jack itself. Further, the cushion member prevents or minimizes damage to tailgates and other objects that impact against the cushion member, as well as to the hitch jack and to the hitch jack cover itself due to impacts from foreign objects. Still further, the fastening mechanism easily and securely fastens the cover over to the hitch jack so as to give the arrangement a more favorable aesthetic appearance than the hitch jack itself, and prevents unauthorized use of the hitch jack.

According to a second aspect of the present invention, the housing upper member and the cushion member have an outer circumference which is larger than an outer circumference of the side wall, and the housing upper member and the cushion member extend downward to horizontal.

The hitch jack cover according to the second aspect of the invention provides additional advantages over conventional hitch jack covers. For example, because the housing upper member and the cushion member have outer circumferences which are larger than an outer circumference of the side wall they are able to better distribute and absorb any impact from a foreign object such as a pickup truck tailgate. Further, because the housing upper member and the cushion member extend downward to horizontal, the cover may be disposed over the hitch jack with the lower portions of the upper member and the cushion member facing forward on the trailer toward a vehicle to which the trailer is connected and thereby may provide additional space for safely lowering a pickup truck tailgate before the tailgate engages against the cushion member.

According to a third aspect of the present invention, an anti-rattling mechanism is provided with the hitch jack cover which cooperates with the fastening mechanism such that the housing as fastened to the hitch jack is restricted or prevented from moving relative to hitch jack. The third aspect of the invention is very desirable for preventing vibrations and rattling of the hitch jack cover, which might otherwise become annoying as the trailer having the hitch jack and hitch jack cover provided thereon travels. Also, this is also advantageous to prevent damage to the hitch jack and hitch jack cover over time resulting from movements of the cover relative to the hitch jack.

Intent of Disclosure

Although the following disclosure offered for public dissemination is detailed to ensure adequacy and aid in understanding of the invention, this is not intended to prejudice that purpose of a patent which is to cover each new inventive concept therein no matter how it may later be disguised by variations in form or additions of further improvements.

There have been chosen specific embodiments of a cover system according to the invention and specific alternative embodiments and modifications thereto, the embodiments chosen for the purposes of illustration and description of the composition and method of the invention are shown in the accompanying drawings forming a part of the specification.

DETAILED DESCRIPTION OF PRESENT EXEMPLARY EMBODIMENTS ACCORDING TO THE PRESENT INVENTION

Overview

Figure 1A:
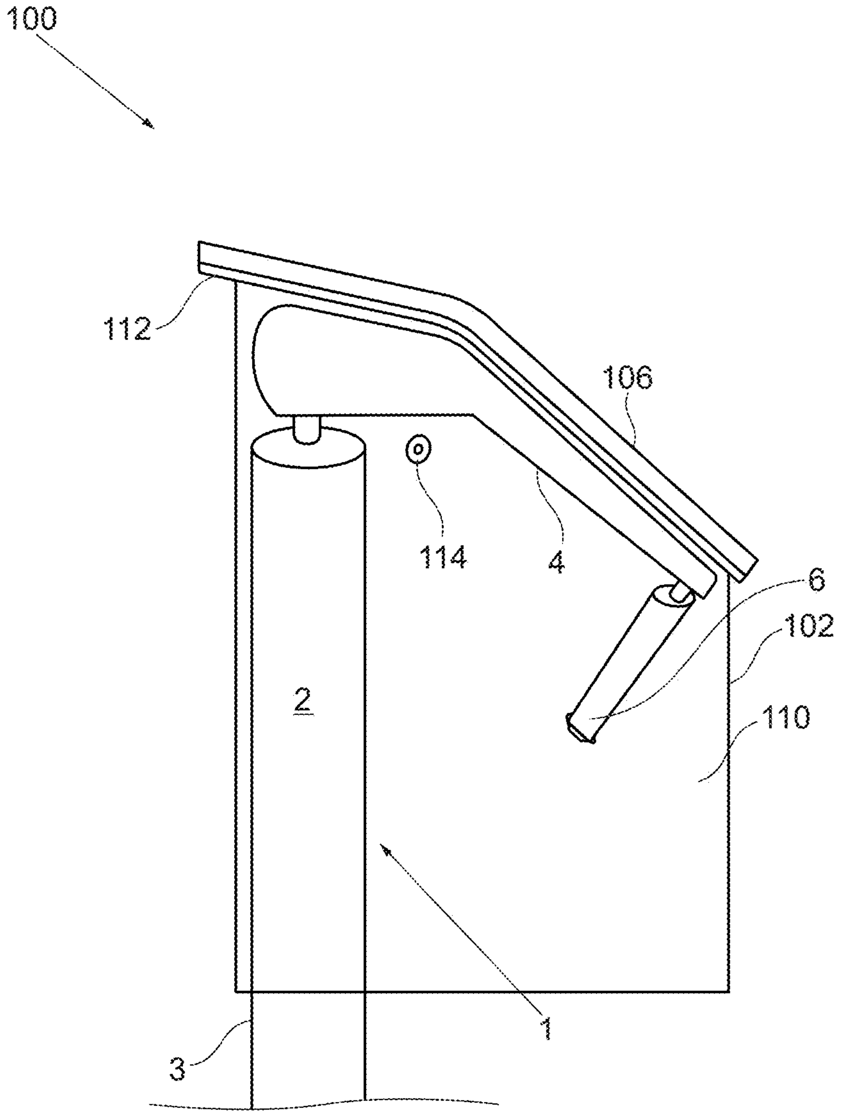
FIG. 1A is a side view of an upper portion of a typical hitch jack, with an outline of a hitch jack cover according to an illustrative exemplary embodiment according to the present invention disposed over the upper portion of the hitch jack.
Figure 1B:
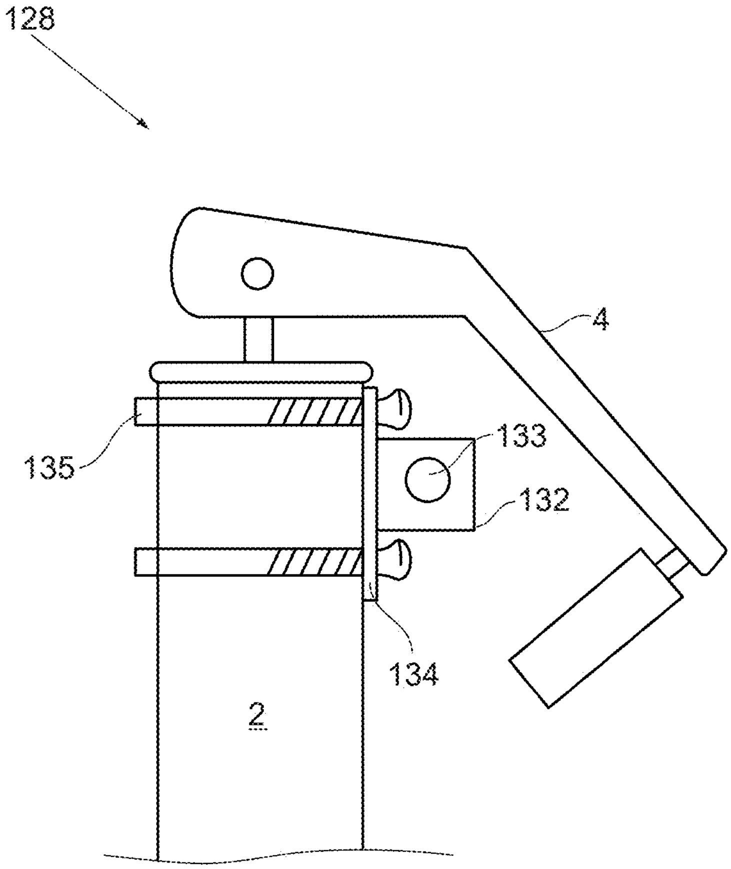
FIG. 1B is a side view of the upper portion of the hitch jack of FIG. 1A having an anti-rattling mechanism according to an exemplary embodiment of the present attached thereto.
Figure 5:
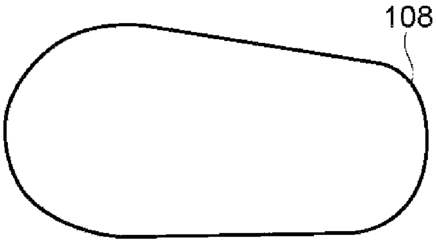
FIG. 5 is a top plan view of the housing of FIG. 3.
Figure 6:
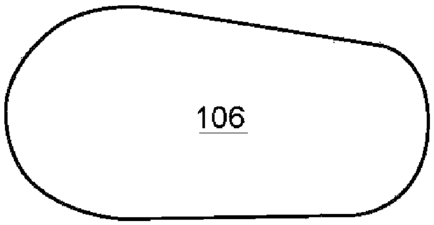
FIG. 6 is a bottom plan view of the housing of FIG. 3.
Figure 7:
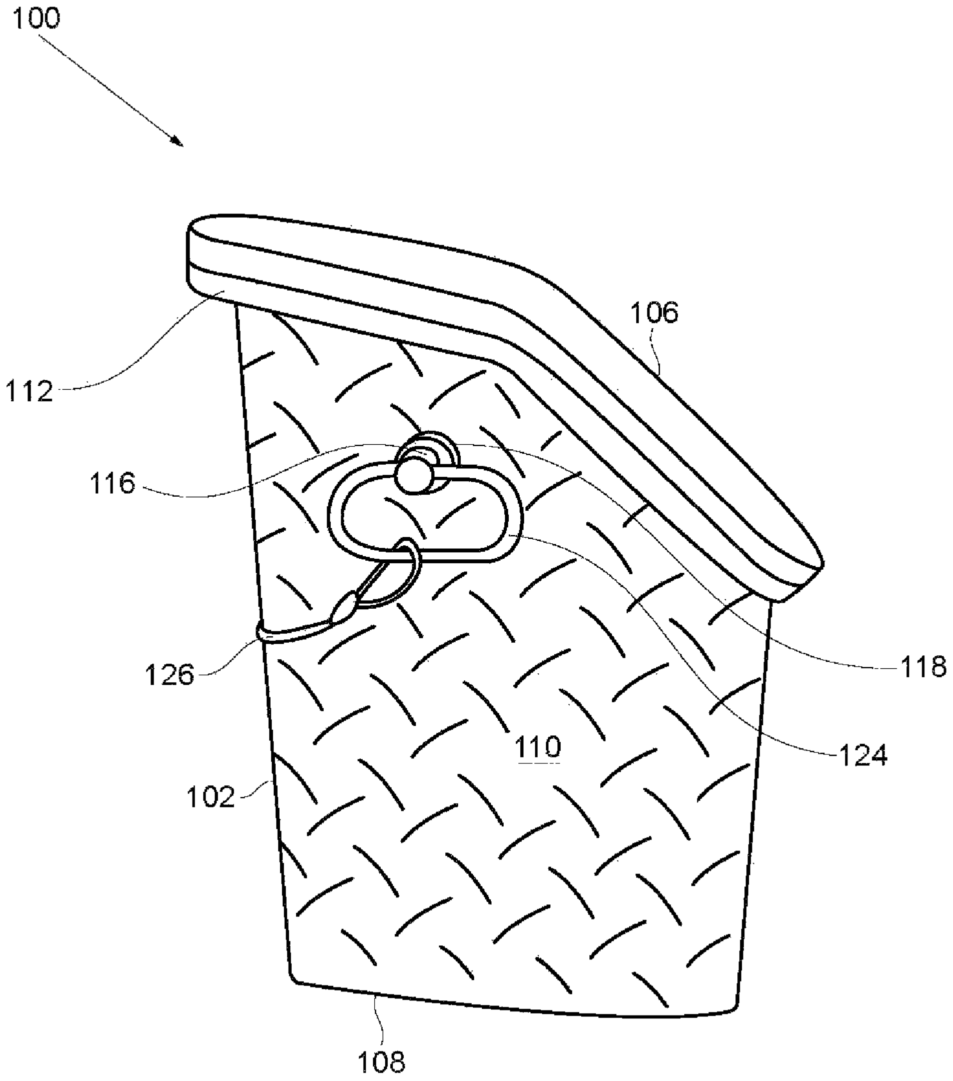
FIGS. 7 and 8 are opposite side views of the housing of FIG. 3 together with a mechanism for securing the housing in covering relation over the upper portion of a hitch jack such as shown in FIG. 1.
Figure 8:
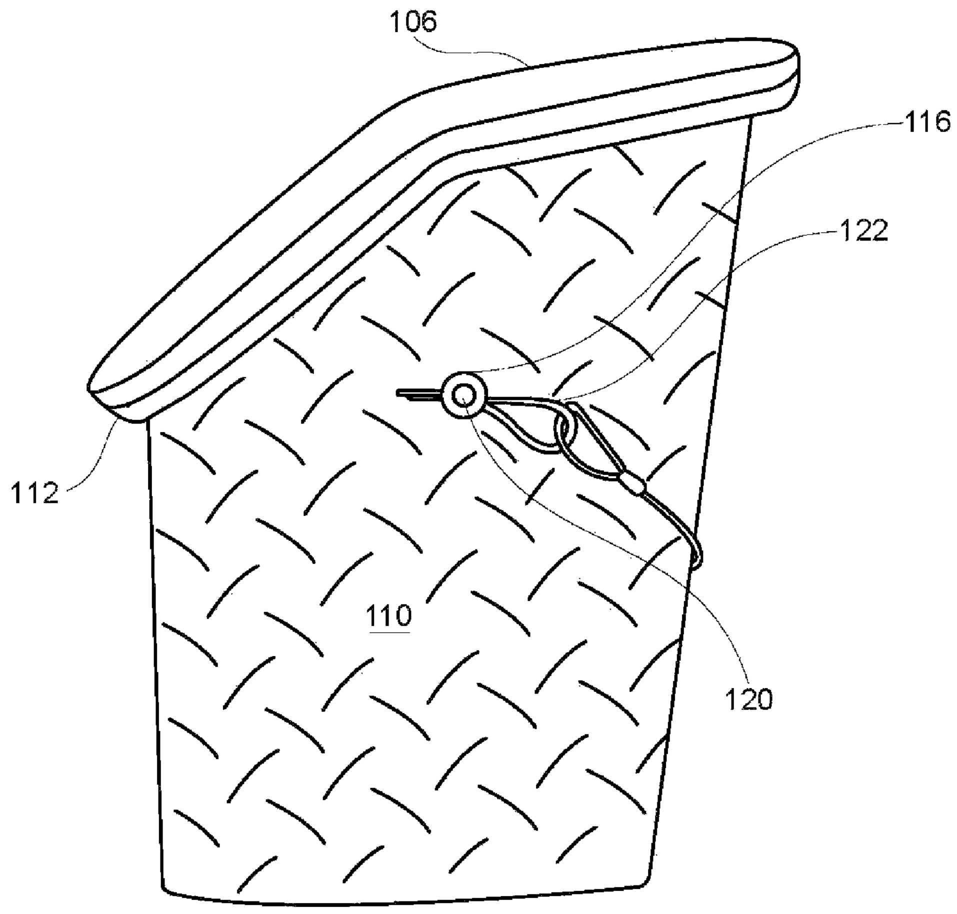
Figure 11:
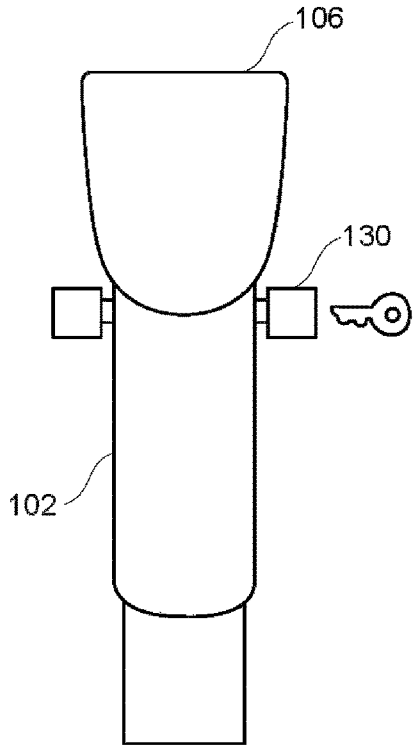
FIG. 11 is a front view of the housing of FIGS. 7-8 including a modified fastening mechanism including a locking device.

Exemplary embodiments of the present invention will now be described in some detail, with reference to FIGS. 1A-10, in which FIGS. 1A and 2A-2C depict upper portions of a typical hitch jacks including different crank handles and FIG. 1A also depicts a hitch jack cover according to an illustrative exemplary embodiment according to the present invention disposed over the upper portion of the hitch jack, FIG. 1B depicts an anti-rattling mechanism which may be used together with a fastening mechanism for securing the hitch jack cover to the hitch jack, FIGS. 3-6 depict a housing of a hitch jack cover according to the illustrative exemplary embodiment according to the present invention, FIGS. 7-10 depict the housing of FIGS. 3-6 together with a mechanism for securing the housing in covering relation over the upper portion of a hitch jack such as shown in FIG. 1A according to an exemplary embodiment of the invention, and FIG. 11 depicts a front view of the housing of FIGS. 7-8 including a modified fastening mechanism including a locking device according to an embodiment of the present invention. It should be understood that only structures considered necessary for clarifying the present invention are described herein. Other conventional structures, and those of ancillary and auxiliary components of the system, are assumed to be known and understood by those skilled in the art. Also, it will be understood that features described in relation to specific ones of the several exemplary embodiments are not limited for use in only the specific ones of the embodiments and modified embodiments, but may also be used in the other exemplary embodiments and modified embodiments.

Figure 2A:
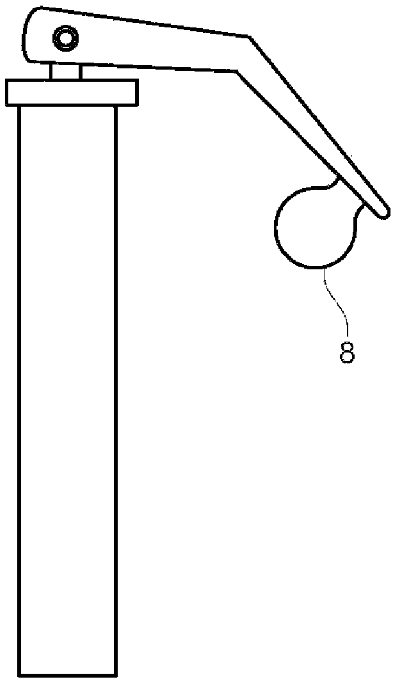
FIGS. 2A-2C are side views of trailer hitch jacks which are different from the hitch jack in FIG. 1 because they have different adjustment mechanisms which may be covered by embodiments of the hitch jack cover according to the present invention having sizes and/or shapes configured to the accommodate the different adjustment mechanisms.
Figure 2B:
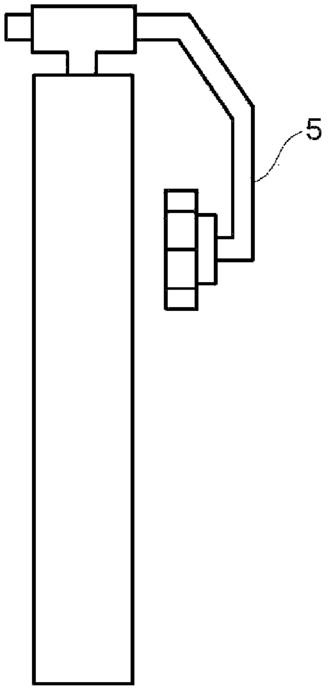
Figure 2C:
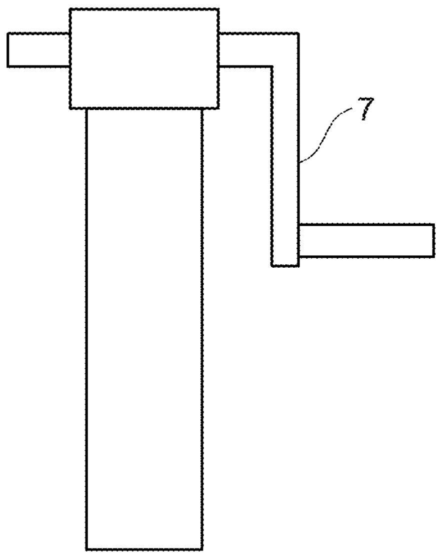
Figure 3:
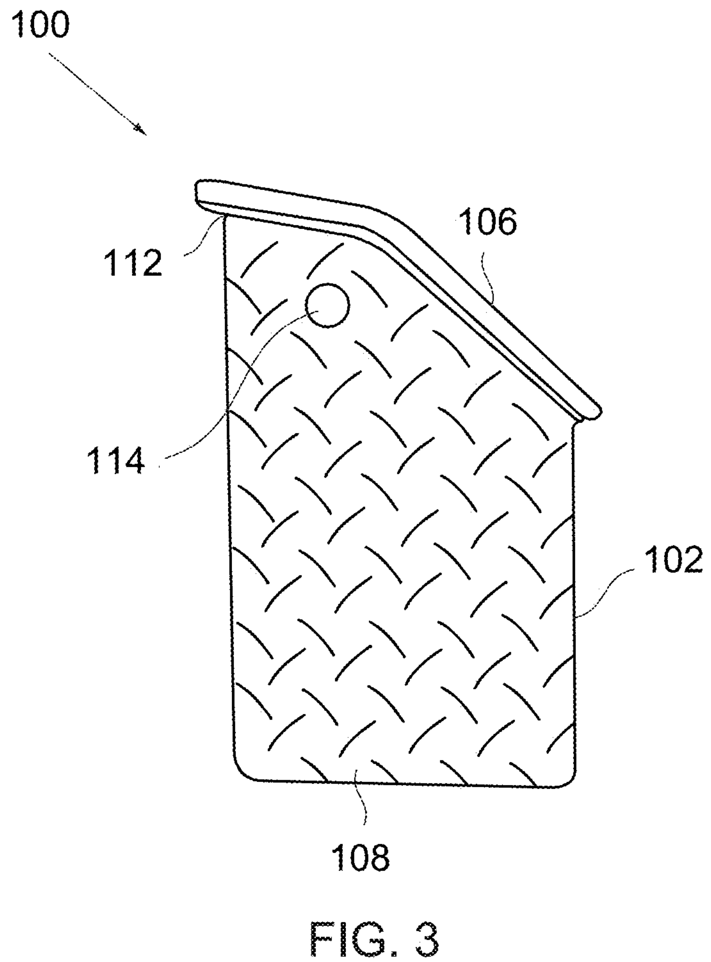
FIG. 3 is a side view of a housing of a hitch jack cover according to the illustrative exemplary embodiment according to the present invention.
Figure 4:
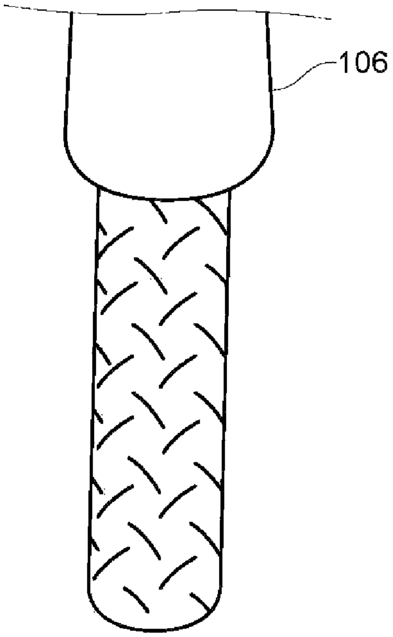
FIG. 4 is a front view of the housing of FIG. 3.

Referring to FIG. 1A there is shown an upper portion of a typical hitch jack 1 such as is typically provided at the front end of a trailer near the trailer's hitch which connects to a securing ball or other connecting mechanism on a vehicle which tows the trailer. The hitch jack is an adjustable mechanism, including a leg 3 with a telescopic mechanism (not shown) disposed within the leg 3 which permits a lower portion of the leg be extended and retracted as desired using a rotatable handle 4 or other adjustment mechanism included with the hitch jack. When extended the leg of the hitch jack will engage the ground or other support surface so that the trailer may remain by itself in a substantially horizontal orientation as self-supported by the trailer's wheels disposed at an intermediate or rear portion of the trailer and the hitch jack disposed at the front of the trailer. When self-supported the trailer's hitch is typically not connected to a vehicle. When the trailer's hitch is connected to a vehicle the lower portion of the hitch jack leg 3 will normally be retracted so that it will not engage the ground as the trailer is traveling. The rotatable handle 4 of the hitch jack may include a cylindrical grip 6 as shown in FIG. 1A or may include grips with other shapes, such as a spherically shaped grip 8 as shown in FIG. 2A, which is sometimes referred to as a suicide knob because it may permit faster rotation of the handle.

There are several different hitch jacks that in the market, and the various hitch jacks may come in different sizes with different adjustment mechanisms for raising and lowering the legs of the hitch jacks, e.g., the different adjustment mechanisms may include different handles. For example, the hitch jack of FIG. 2A includes an adjustment mechanism having the spherically shaped grip 8 rather than the tubular grip of the handle 4 in FIG. 1A. The adjustment mechanism of FIG. 2B includes a handle 5 which is disposed in closer relation to hitch jack leg than the handle 4 of the hitch jack in FIG. 1A, while the adjustment mechanism of FIG. 2C includes a handle 7 which is disposed to project perpendicularly away from the hitch jack unlike the handle portion 4 of the hitch jack in FIG. 1A, while the handle portion of FIG. 1A extends toward the hitch jack at an angle to horizontal.

FIG. 1A also depicts the outline of a hitch jack cover 100 according to an exemplary embodiment of the invention, and the cover 100 is discussed in relation to FIGS. 3-10, which depict the cover 100 in greater detail than FIG. 1A. Generally, the cover 100 according to the exemplary embodiment includes a housing 102, a fastening mechanism 104 which is configured to secure the housing to the operative upper portion of a hitch jack and a cushion member 106 provided in covering relation to an upper surface of the housing 102. The housing 102 may come in different sizes to accommodate the different shapes and sizes of the hitch jacks being sold in the market. FIG. 1B is a side view of the upper portion of the hitch jack of FIG. 1A having an anti-rattling mechanism 128 according to an exemplary embodiment of the present attached thereto, which anti-rattling mechanism is used together with the fastening mechanism as discussed herein for preventing or minimizing movements between the hitch jack cover and the hitch jack to which it is secured. Any such movements would be undesirable at they may generate annoying noises and vibrations, and may also lead to premature failure of the hitch jack cover and/or the hitch jack.

Referring to FIGS. 3-10, the housing 102 is structured with a somewhat oval cross sectional shape, defines an open space therein, has a lower open end 108, and has a size such that it may be securely disposed over an operative upper portion of the hitch jack 1 including a crank handle 4 so as to enclose the operative upper portion of the hitch jack 1. The housing includes a tubular side wall 110 which may be oval or oblong in cross-section, defines the open space in the cover and may be formed of metal, plastics, reinforced plastics, other appropriate rigid material or combinations of these materials. The housing also includes an upper member 112 fixed to an upper end of the side wall so as to close the upper end of the side wall and may be formed of the same material(s) as the side wall 110. Also the side wall 110 may have openings 114 defined in opposed portions of the side wall, and such openings may be configured to receive therethrough a pin 116 of the fastening mechanism 104. The openings 114 may be located such that the pin 116 will extend beneath and adjacent to the handle portion 4 of the hitch jack when the housing is disposed over the hitch jack including the adjustment mechanism such that the pin, the side wall and the handle portion jointly secure the housing onto the hitch jack, as discussed further herein.

The side wall 110 may be formed of a metal such as aluminum or an aluminum alloy, other metals such as steel, stainless steel, other rigid materials such as plastics, reinforced plastics or a combination of one or more these. For example, the side wall 102 may be formed of an aluminum sheet material or plate having a thickness of 1/32 to 1/8 inch, which maybe formed into an oval or oblong shape so that the opposite ends of the sheet material or plate engage each other, and then the opposite ends are connected together by welding or other means. The upper member 112 may be formed of one or more of the same materials used in forming the side wall and may also have a thickness of 1/32 to 1/8 inch. For example, if the side wall 110 and upper member 112 are formed of aluminum or steel, these two components may be welded together, and if these components are made of reinforced plastics they may be bonded together with adhesive and/or heat. Preferably, the welds or other connections between the opposite ends of the material(s) forming the side wall 110 and between the upper end of the side wall and the upper member 112 are fluid-tight so that water and other foreign matter is prevented from flowing into the space inside of the housing 102 through these connections. Optionally, sealing material (not shown) may be provided in association with the connections to assure that they are fluid-tight. Also optionally, some type of flap or other seal (not shown) may be provided in association with the open lower end 108 of the side wall to restrict water and other foreign matter from entering the hollow space within the side wall 110 through the open lower end 108. For example, a flap made of rubber or other flexible elastic material having a central opening through which the upper, operative portion of the hitch jack may extend may be secured to the open lower end 108 to partially close it. Even if the optional flap or seal is not used, the opening in the lower open end 108 of the housing 102 faces downward toward the trailer such that the trailer blocks some water and foreign matter from entering into the housing through the open lower end 108.

Use of such metals and/or other rigid materials in forming the side wall and housing upper member, makes it difficult for unauthorized persons to remove the cover 100 from a hitch jack 1 to which it is secured by impacting the cover with a hammer or other such object because such materials are not easily broken or compromised by impact blows from a hammer or the like. Also, such materials tend to give the housing 102 a relatively long useful life.

The cushion member 106 may be formed of any appropriate impact-absorbing material that can withstand prolonged exposure to the environment. For example, the cushion member 106 may be formed of rubber, other elastomeric materials, or such materials which have been foamed, and may have an appropriate thickness for absorbing impacts such as ⅛ to ½ inch. The cushion member may be fixed to the upper surface of the housing upper member 112 using an appropriate adhesive or any other appropriate means.

As depicted, an upper end of the side wall 110, the upper member 112 of the housing and the cushion member 106 may extend downward, at least partly, from one end to the other, rather than extending along a single plane. Such downwardly extending shape may generally corresponds to an upper sloping surface of the handle 4 of the hitch jack 1 so that the upper member 112 and the handle 4 can be disposed with little or no gap therebetween as shown in FIG. 1. This is desirable for closely fitting the cover 100 over the upper portion of the hitch jack and for achieving a relatively compact size for the cover. Additionally, with such shape, the housing 100 may be disposed over the upper portion of the hitch jack such that the end of the housing 102 having the upper portion disposed at a lower level faces forward toward the front end of the trailer and a vehicle which tows the trailer. This is advantageous because it permits a towing vehicle such as a pickup truck to open and lower a tailgate to a greater degree before it impacts against the cushion member 106 of the housing 102 while the trailer remains connected to the vehicle compared to how much the tailgate could be opened before contacting the cushion member if the housing's upper portion extended continuously along a single plane. As shown in FIG. 1A, in the exemplary embodiment the upper member 112 extends downward at different angles at front and rear portions of the cover member, respectively, which corresponds to different portions of the handle 104. However, the upper member can extend downward in different manners, e.g., it may extend downward at one set angle for the entire upper member, it may curve downward, etc.

The oval or oblong shape of the housing 102 desirably permits the housing to fully cover or enclose the operative upper end of the hitch jack 1, including the rotatable handle, such that foreign objects cannot contact any part of the upper portion of the hitch jack when it is covered and thereby preventing damage to hitch jack and to the foreign objects. The oblong shape of the housing 102 as shown in FIGS. 5, 6 is advantageous for permitting the cover 100 to closely surround the upper portion of the hitch jack without any excessive spacing between the cover and the various parts of the hitch jack upper portion even though the various parts may have different widths, e.g., the rotatable handle 4 typically has a more narrow width than the main portion 2 of the hitch jack.

It is also possible to provide the cover 100 with different cross-sectional shapes and lengths so that the cover may appropriately fit over the upper portion of different hitch jacks. For example, a cover configured for a hitch jack with a narrow cylindrical handle grip 6 such as shown in FIG. 1A would have a more narrow cross-section than that of a cover configured for a hitch jack with a spherical handle grip 8 such as shown in FIG. 2A, while a cover for the hitch jack of FIG. 2B may have a shorter length than a cover for the hitch jack of FIG. 2C based on the shapes and orientations of the handles of these hitch jacks.

Figure 9:
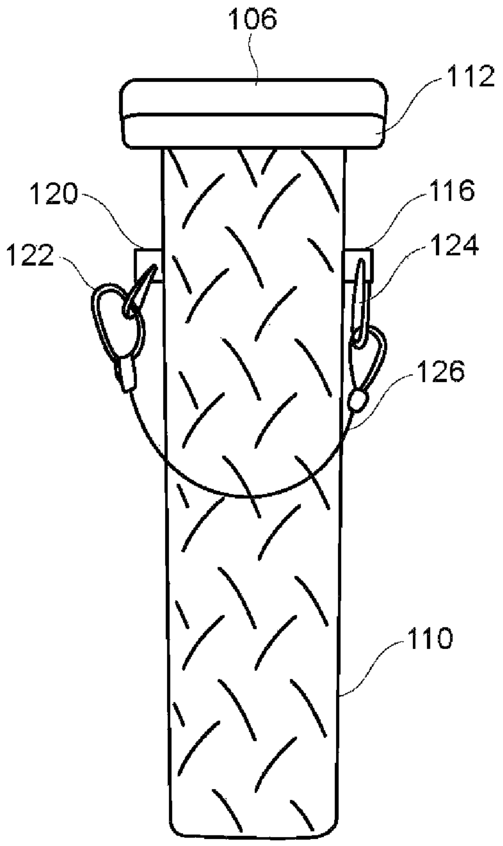
FIG. 9 is a rear view of the housing and securing mechanism of FIGS. 7, 8.
Figure 10:
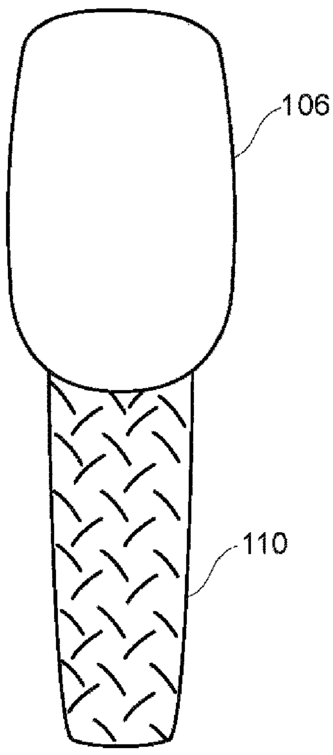
FIG. 10 is a front view of the housing of FIGS. 7, 8.

Referring to FIGS. 7-9, the fastening mechanism 104 may include the pin which 116 extends through the opposed openings 114 defined in the housing side wall, and a locking device 122 such as a cotter pin, clip, etc. which can selectively lock the pin 116 in position when the cover 100 is disposed over the upper portion of the hitch jack 1 or permit the pin to be removed when the cover is to be placed onto or removed from the hitch jack. In the depicted embodiment, opposite ends of the pin 116 project outward of the sidewall 110 of the cover 100, with one end of the pin provided with a flange 118 or other enlargement that stops the one end of the pin from passing through the openings 114, and the opposite end of the pin has a small opening 120 defined therethrough which may selectively receive the cotter pin, clip or other securing device 122 therein for preventing the opposite end of the pin 116 from passing through the openings 114 when the securing device 122 is attached to the pin. As depicted, the fastening mechanism may further include a handle 124 which is attached to the one end of the pin 116 to facilitate handling of the pin and a cable 126 formed of steel or other appropriate material which has one end fixed to the handle 124 and an opposite end fixed to the securing device 122 so that the locking device cannot completely separated from the pin, and hence prevents the locking device from being misplaced or lost. The handle 124 may be rotatably attached to the one end of the pin 116 so that the handle may be moved between a storage position in engagement with the pin and a use position extending away from the pin.

The location of the openings 114 in the side wall selected such that when cover is placed over the upper portion of the hitch jack and the pin 116 is extended through the openings 114 the pin will extend between the main body 2 and the rotatable handle 104 of the hitch jack such as indicated in FIG. 1. Thus located, if someone were to attempt to remove the cover 100 from the hitch jack 11 while the securing device 122 is in place, the pin 116 will engage against the handle 4 of the hitch jack, while the handle engages against the upper member 112 of the cover after little or no movement, and the combination of these things prevents the cover from being removed. In other words, securing device 122, together with the pin 116, the cover 100, and the crank handle 4 jointly secure the housing onto the operative upper portion of a hitch jack. The location of the openings 114 may be such that when the pin is extended through the openings the pin engages the adjustment mechanism or another part of the hitch jack to restrict or prevent hitch jack cover from moving relative to the hitch jack. Any such movements would be undesirable as they would likely result in unwanted rattling and vibrations of the hitch jack cover whenever the trailer on which hitch jack and cover are mounted is travelling, and may also cause damage to the hitch jack over time.

In addition to proper placement of the openings 114 in the cover housing 102 other means may be provided for preventing or minimizing ratting of the cover 100 relative to the hitch jack 1. With reference to FIG. 1B, there is shown an anti-rattling mechanism 128 which may be provided with the hitch jack cover which cooperates with the fastening mechanism such that the housing as fastened to the hitch jack is restricted or prevented from moving relative to hitch jack. The anti-rattling mechanism 128 generally includes a guide 132 having opening(s) 133 defined therein which have a diameter slightly larger than the diameter of the pin 116 through which the pin may be extended and a fastening device 135 for fastening the guide 132 to the leg of the hitch jack. The guide 132 may include plate or short rectangular tube having the opening(s) 133 defined therein and a base 134 which engages against the outer surface of hitch jack leg, while the fastening device 135 may include one or more clamps which secure the base 134 to the hitch jack leg. The opening(s) 133 will align with the openings 114 in the housing 102 of the cover such that the pin 116 will pass through all of these openings when the cover 100 is secured to the hitch jack. It is important that the diameter of the opening(s) 133 is only slightly greater than the diameter of the pin 116 for preventing and minimizing movements of the cover 100 relative to the hitch jack leg 3 The anti-rattling mechanism 128 is very desirable for preventing vibrations and rattling of the hitch jack cover, which might otherwise become annoying as the trailer having the hitch jack and hitch jack cover provided thereon travels. Also, this is also advantageous to prevent damage to the hitch jack and hitch jack cover over time resulting from movements of the cover relative to the hitch jack.

While the securing device 122 in the depicted embodiment is a cotter pin or clip which may be readily removed from the pin 116, it is also within the scope of the present invention for the locking device to include a more secure device such as a padlock or the like such as a key operated lock 130 as shown in FIG. 11 or other locking device for securing the pin 116 to prevent unauthorized removal of the cover 100. This provides an added element of security against unauthorized removal of the cover.

The hitch jack cover according to the exemplary embodiment of the invention is very advantageous over conventional hitch jack covers for several reasons. For example, it completely encloses the operative upper portion of a hitch jack including the crank handle so that it prevents the operative upper portion from being exposed to the environment, it prevents the hitch jack from being used by unauthorized person, it is not easily damaged because side wall and upper member are formed of metal and/or other rigid materials, and it provides an much more aesthetic appearance than the hitch jack itself. Further, the cushion member prevents objects that impact against it from being damaged. Still further, fastening mechanism easily and securely fastens the cover over the operative upper portion of the hitch jack, and prevents unauthorized use of the hitch jack, particularly if the fastening mechanism includes a locking device requiring a key or the like for its removal. Also, because the housing upper member and the cushion member have an outer circumference which is larger than an outer circumference of the side wall they are able to better distribute and absorb any impact from a foreign object such as a pickup truck tailgate. Further, because the housing upper member and the cushion member extend downward at an angle to horizontal, the cover may be disposed over the operative upper portion of the hitch jack with minimal clearance so that the cover may be relatively compact in size, and the cover may be disposed on the hitch jack with the lower ends of the upper member and the cushion member facing forward on the trailer and thereby may provide additional space for lowering a pickup truck tailgate before the tailgate engages against the cushion member.

The foregoing description involving present exemplary embodiments of the hitch jack cover according to the exemplary embodiments of the present invention is given for clearness of understanding only, and no unnecessary limitations should be understood therefrom. Modifications within the scope of the claimed invention will be apparent to those having ordinary skill in the art and are encompassed within the scope of the invention. For example, the pin 116 need not have the handle 124 and/or cable 126 provided therewith, while layers of additional cushioning material such as foamed elastomer may be provided on the inner surfaces of the side wall 110 and upper member 112 of the cover housing 102 to prevent the cover from creating vibrations, rattling noises and the like when it engages against parts of the hitch jack. The scope of the invention is indicated by the claims appended hereto.

I claim:

1. A cover for a trailer hitch jack having an adjustment mechanism with a crank handle, the cover comprising:

a housing with a closed upper end and a lower open end and configured to be securely disposed over the trailer hitch jack so that the housing surrounds an operative upper portion of the trailer hitch jack, including the adjustment mechanism crank handle, entirely except at the lower open end of the housing;

a cushion member fixed to the housing; and a fastener which secures the housing to the trailer hitch jack, wherein the housing is formed of metal and includes a tubular housing side wall which defines an open space therein which is configured to surround the operative upper portion of the trailer hitch jack, and the closed upper end of the housing includes a housing upper member which is fixed to and closes an upper end of the tubular housing side wall, the cushion member covers only the housing upper member, the fastener includes a pin which is configured to be extended through and removed from opposed openings defined in portions of the tubular housing side wall which define the open space, for selectively fastening and unfastening the housing to the trailer hitch jack and a member which attaches to at least one end of the pin, and which prevents the at least one end of the pin from passing through the opposed openings defined in the tubular housing side wall when the member is attached to the at least one end of the pin, to thereby secure the pin to the tubular housing side wall, and the opposed openings are defined in opposing upper portions of the tubular housing side wall such that when the housing is disposed over the trailer hitch jack and the pin is extended through the opposed openings the pin will be disposed below and adjacent to the adjustment mechanism crank handle of the trailer hitch jack, and when so disposed, if the housing is moved upward relative to the trailer hitch jack the pin will engage against the adjustment mechanism crank handle to prevent the housing from being displaced off of the trailer hitch jack.

2. The trailer hitch jack cover according to claim 1, further comprising a lock which selectively locks and unlocks the fastener to the trailer hitch jack cover.

3. The trailer hitch jack cover according to claim 1, further comprising an anti-rattling mechanism configured to be operatively connected to the trailer hitch jack and which minimizes movements of the trailer hitch jack cover relative to the trailer hitch jack when the housing is fastened to the trailer hitch jack, wherein the anti-rattling mechanism includes a guide which is configured to be fixed to the trailer hitch jack, which has an opening defined therein which receives an intermediate portion of the pin therethrough, and wherein when the housing is securely disposed over the trailer hitch jack the anti-rattling mechanism is entirely enclosed by the housing, including the tubular housing side wall and housing upper member, except at the lower open end of the housing.

4. The trailer hitch jack cover according to claim 1, wherein each of the housing upper member and the cushion member has an outer circumference which is larger than an outer circumference of the tubular housing side wall.

5. The trailer hitch jack cover according to claim 1, wherein the cushion member fully covers the upper surface of the housing upper member.

6. The trailer hitch jack cover according to claim 1, wherein the tubular housing side wall is longer on one side thereof and shorter on an opposite side thereof so that when the housing is disposed over the trailer hitch jack the housing upper member and the cushion member extend downward from the longer one side of the tubular housing side wall to the shorter opposite side of the tubular housing side wall.

7. The trailer hitch jack cover according to claim 1, wherein the closed upper end of the housing and the tubular housing sidewall are fluid-tight except at the lower open end thereof and at the opposed openings defined in the tubular housing side wall.

* * * * *